United States Patent
Assaliyski et al.

(10) Patent No.: US 11,358,584 B2
(45) Date of Patent: Jun. 14, 2022

(54) ELECTRIFIED VEHICLE ENERGY MANAGEMENT FOR ROBUST COLD POWER DISCHARGE CAPABILITY

(71) Applicant: FORD GLOBAL TECHNOLOGIES, LLC, Dearborn, MI (US)

(72) Inventors: Marin Assaliyski, Dearborn, MI (US); Connor McCann, Berkley, MI (US); Youssef El-Minyawi, East Lansing, MI (US); Kevin Vander Laan, Bloomfield Hills, MI (US); William David Treharne, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 223 days.

(21) Appl. No.: 16/373,582

(22) Filed: Apr. 2, 2019

(65) Prior Publication Data
US 2020/0317187 A1    Oct. 8, 2020

(51) Int. Cl.
| B60W 20/13 | (2016.01) |
| B60W 10/06 | (2006.01) |
| B60W 10/02 | (2006.01) |
| B60W 10/26 | (2006.01) |
| B60W 50/14 | (2020.01) |
| B60W 50/08 | (2020.01) |
| B60W 20/40 | (2016.01) |

(52) U.S. Cl.
CPC ............ *B60W 20/13* (2016.01); *B60W 10/02* (2013.01); *B60W 10/06* (2013.01); *B60W 10/26* (2013.01); *B60W 20/40* (2013.01); *B60W 50/085* (2013.01); *B60W 50/14* (2013.01); *B60W 2510/081* (2013.01); *B60W 2555/20* (2020.02); *B60W 2710/021* (2013.01); *B60W 2710/244* (2013.01); *B60Y 2200/92* (2013.01)

(58) Field of Classification Search
CPC combination set(s) only.
See application file for complete search history.

(56) References Cited

U.S. PATENT DOCUMENTS

| 8,937,452 B2 | 1/2015 | Schwarz et al. |
| 9,403,527 B2 | 8/2016 | Magnet et al. |
| 2014/0228168 A1* | 8/2014 | Kaufman ................. B60K 6/48 477/5 |
| 2017/0210390 A1* | 7/2017 | Porras ............. B60W 30/18054 |
| 2018/0204393 A1 | 7/2018 | Landolsi et al. |
| 2018/0356242 A1* | 12/2018 | Kritzmacher ..... B60W 50/0097 |
| 2020/0331452 A1* | 10/2020 | Ferreira De Araujo .................... B60W 20/13 |

* cited by examiner

Primary Examiner — Jeff A Burke
Assistant Examiner — Zachary Joseph Wallace
(74) Attorney, Agent, or Firm — Brooks Kushman PC; David Kelley (57) ABSTRACT

A vehicle having an engine, a battery, and an electric machine configured to propel the vehicle and selectively coupled to the engine to start the engine includes a controller configured to prompt for input to activate a cold weather mode in response to an expected ambient temperature to be below a first temperature threshold for a time period during which a subsequent engine start is anticipated, and to operate the engine and electric machine to maintain a state of charge (SOC) of the battery above a first SOC threshold in response to activation of the cold weather mode, and a second SOC threshold lower than the first SOC threshold otherwise.

20 Claims, 3 Drawing Sheets

ELECTRIFIED VEHICLE ENERGY MANAGEMENT FOR ROBUST COLD POWER DISCHARGE CAPABILITY

TECHNICAL FIELD

This disclosure relates to an electrified vehicle and methods for controlling an electrified vehicle to provide robust power discharge capability from a traction battery during extremely cold ambient temperatures.

BACKGROUND

Electrified vehicles including battery electric vehicles (BEVs), plug-in hybrid electric vehicles (PHEVs) and various other types of hybrid electric vehicles (HEVs) may use a high-voltage (HV) traction battery and in some cases an internal combustion engine alone or in combination to provide torque to the vehicle wheels for propulsion depending on various vehicle and ambient operating conditions and selected operating modes. Vehicles may also include a low-voltage battery to power accessories and/or to power a starter motor to crank the engine during cold starting. However, it is desirable to eliminate the starter motor and the low-voltage battery to reduce vehicle weight and improve overall efficiency. These vehicles rely on the availability of power from the HV battery to power accessories and/or to start the engine. However, the power discharge capability of the HV battery may be substantially reduced when operating at extremely cold ambient temperatures. In addition, more viscous engine and accessory fluids and associated higher frictional forces may require increased battery power to reliably crank and start the engine.

SUMMARY

Embodiments according to the disclosure include a vehicle having an engine, a battery, a step-ratio transmission, an electric machine configured to be selectively powered by the battery and to selectively charge the battery and coupled by a first clutch to the engine and coupled by a second clutch to the step-ratio transmission, and a controller configured to operate the engine to maintain a state of charge (SOC) of the battery above an associated SOC threshold during a current drive cycle, wherein the associated SOC threshold is adjusted based on a forecasted temperature for a future time period during which an engine start is expected being less than an associated temperature threshold. The vehicle may include a human-machine interface (HMI) in communication with the controller and configured to prompt for input to select a cold weather mode, wherein the SOC threshold is adjusted only when the cold weather mode is selected. The cold weather mode may be automatically selected or activated by the controller in response to the forecasted temperature being less than a second associated temperature threshold. The controller may be configured to automatically deselect the cold weather mode in response to the forecasted temperature being above the associated temperature threshold for a selected period of time.

In one or more embodiments, the controller starts the engine by engaging the first clutch to couple the electric machine to the engine after the electric machine has reached a predetermined rotational speed. The battery may be a high-voltage traction battery and the vehicle may not include an engine starter motor configured to engage an engine flywheel. The controller may be configured to receive the forecasted temperature wirelessly. The vehicle may include a transceiver configured to receive the forecasted temperature and communicate the forecasted temperature to the controller. The transceiver may be configured to receive the forecasted temperature via a nomadic device paired or coupled to the transceiver. The vehicle may be an electrified vehicle, such as a plug-in hybrid electric vehicle, wherein the battery is a high-voltage traction battery, and wherein the vehicle further includes a charger configured to charge the battery from an external electrical grid. The associated SOC threshold may increase as the forecasted temperature decreases. The forecasted temperature may be based on a location of the vehicle.

Embodiments may also include a vehicle having an engine, a battery, an electric machine configured to propel the vehicle and selectively coupled to the engine to start the engine, and a controller configured to prompt for input to activate a cold weather mode in response to an expected ambient temperature to be below a first temperature threshold for a time period during which a subsequent engine start is anticipated, and operate the engine and electric machine to maintain a state of charge (SOC) of the battery above a first SOC threshold in response to activation of the cold weather mode, and a second SOC threshold lower than the first SOC threshold otherwise.

In one or more embodiments, the controller is further configured to automatically activate the cold weather mode in response to the expected ambient temperature being below a second temperature threshold for the time period, wherein the second temperature threshold is lower than a first temperature threshold that prompts for a user activation of a cold weather mode. The vehicle may include a step-ratio transmission, wherein the electric machine comprises a shaft coupled to the engine by a first clutch and to the step-ratio transmission by a second clutch. The vehicle may also include a transceiver configured to wirelessly receive the expected ambient temperature from a weather service. The transceiver may be configured to wirelessly receive the expected ambient temperature from a paired nomadic device.

Embodiments may also include a method for controlling a vehicle having an engine, a battery, and an electric machine configured to propel the vehicle and selectively coupled to the engine to start the engine. The method may include, by a vehicle controller, operating the engine to maintain a battery state of charge (SOC) above a first SOC threshold in response to an expected ambient temperature for a future engine start being below a first temperature threshold when operating in a cold weather mode, and operating the engine to maintain the SOC above a second SOC threshold when not operating in the cold weather mode, wherein the second SOC threshold is lower than the first SOC threshold. The method may also include prompting for activation of the cold weather mode in response to the expected ambient temperature being below the first temperature threshold. In various embodiments, the method includes automatically activating the cold weather mode in response to the expected ambient temperature being below a second temperature threshold.

One or more embodiments may provide various advantages. For example, robust cold weather starting may be provided by maintaining a higher minimum SOC while operating in a cold weather mode based on a forecasted or anticipated cold ambient temperature for a subsequent engine start. Prompting the driver to activate the cold weather mode when forecasted temperature(s) are below an associated threshold provides additional robust battery power discharge for engine starting without impacting efficiency or performance when ambient temperatures do not significantly impact battery discharge capability or engine cranking and starting. More robust engine cold starting capability using the high-voltage traction battery and traction motor facilitates elimination of a traditional engine starter motor and low-voltage auxiliary battery to reduce vehicle weight, cost, and part count.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
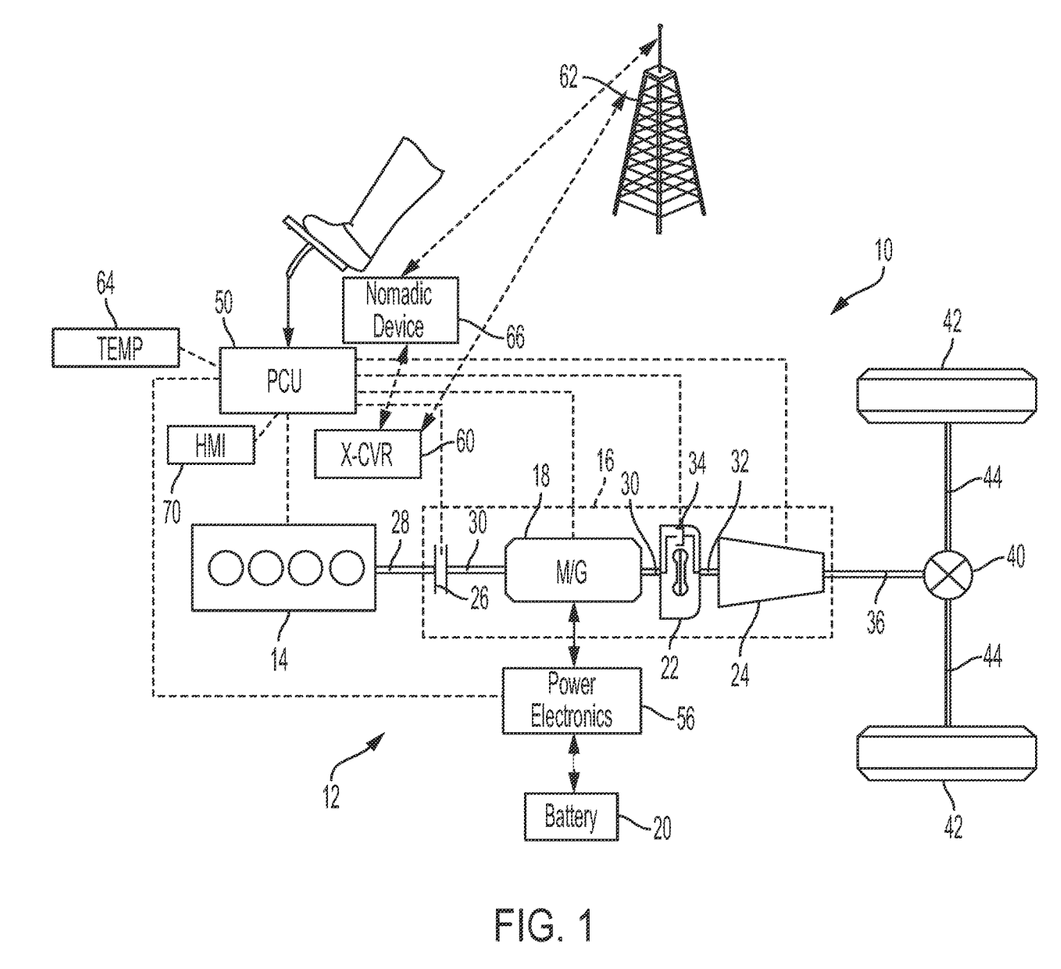
FIG. 1 is a block diagram of a representative electrified vehicle having an internal combustion engine without a low-voltage starter motor including a cold battery power discharge strategy according to one or more embodiments.

Referring to FIG. 1, a schematic diagram of a hybrid electric vehicle (HEV) 10 having a robust cold weather battery power discharge strategy according to an embodiment of the present disclosure is illustrated. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 may include an electric machine 18 that may function as an electric motor/generator to selectively propel the vehicle and charge one or more associated batteries, such as traction battery 20. Transmission 16 may also include a torque converter 22, and a multiple step-ratio automatic transmission, or gearbox 24. Depending on the particular application and implementation, transmission 16 may include only step-ratio gear box 24 and torque converter 22.

The engine 14 and the electric machine are both drive sources for the HEV 10. The engine 14 generally represents a power source that may include an internal combustion engine such as a gasoline, diesel, or natural gas powered engine, or a fuel cell, for example. The engine 14 generates an engine power and corresponding engine torque that is supplied to electric machine 18 when a first clutch or disconnect clutch 26 disposed between the engine 14 and the electric machine 18 is at least partially engaged. The electric machine 18 may be implemented by any one of a number of types of electric machines. For example, electric machine 18 may be a permanent magnet synchronous motor. Power electronics 56 condition direct current (DC) power provided by the battery 20 to the requirements of the electric machine 18, as will be described below. For example, power electronics may provide three-phase alternating current (AC) to the electric machine 18.

When the disconnect clutch 26 is at least partially engaged, power flow from the engine 14 to the electric machine 18 or from the electric machine 18 to the engine 14 is possible. For example, the disconnect clutch 26 may be engaged and electric machine 18 may operate as a generator to convert rotational energy provided by a crankshaft 28 and electric machine shaft 30 into electrical energy to be stored in the battery 20. The disconnect clutch 26 can also be disengaged to isolate the engine 14 from the remainder of the powertrain 12 such that the electric machine 18 can act as the sole drive source for the HEV 10. Shaft 30 extends through the electric machine 18. The electric machine 18 is continuously drivably connected to the shaft 30, whereas the engine 14 is drivably connected to the shaft 30 only when the disconnect clutch 26 is at least partially engaged. Similarly, electric machine 18 may be selectively coupled by disconnect clutch 26 to crankshaft 28 to crank or start engine 14. Disconnect clutch 26 may be closed after electric machine 18 attains a predetermined rotational speed to start the engine 14. As such, vehicle 10 does not include a traditional starter motor powered by a low-voltage auxiliary battery that engages teeth of a flywheel of the engine 14 to start the engine, which may provide various advantages as described herein.

The electric machine 18 is connected to the torque converter 22 via shaft 30. The torque converter 22 is therefore connected to the engine 14 when the disconnect clutch 26 is at least partially engaged. The torque converter 22 includes an impeller fixed to electric machine shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. A second clutch, implemented by a torque converter bypass clutch 34 in one embodiment, may also be provided to couple the electric machine 18 to downstream components of the powertrain to propel the vehicle or provide regenerative braking. Torque converter bypass clutch 34 frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the electric machine 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the gearbox 24 used with a torque converter 22 may be hydraulically controlled and is but one example of a gearbox or transmission arrangement; any multiple ratio gearbox is acceptable for use with various embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. While illustrated as a rear wheel drive configuration, powertrain 12 may also be configured as a front wheel drive or all wheel drive powertrain.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC) and battery electronic control module (BECM), for example. It should therefore be understood that the powertrain control unit 50 and one or more other controllers can collectively be referred to as a "controller" that controls various actuators in response to signals from various sensors to control functions such as starting/stopping engine 14, operating electric machine 18 to provide wheel torque or charge battery 20 or start engine 14, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, electric machine 18, launch clutch 34, transmission gearbox 24, and power electronics 56. PCU 50 may also send and/or receive data wirelessly via an associated modem or transceiver 60. Transceiver 60 may communicate with a weather service via a satellite or cellular tower 62 to receive forecasted or expected ambient temperatures for a time period during which a future or subsequent engine start may be performed. Similarly, transceiver 60 may communicate wirelessly with a paired or coupled nomadic device 66, such as a cell phone, tablet, computer, watch, or other wearable device. Nomadic device 66 may communicate wirelessly with a satellite or cellular tower 62 to receive weather information including forecasted, anticipated, or expected temperatures for a particular geographic location or region during a future period when a engine start is anticipated or expected. Nomadic device 66 may then communicate related weather or temperature information to PCU 50 for use in implementing a cold weather battery discharge strategy according to various embodiments. Ambient temperature information may also be provided by an associated temperature sensor 64 in communication with PCU 50. Current temperature information from temperature sensor 64 may be compared to received forecasted or predicted temperature information to detect unlikely discrepancies and trigger an associated warning or alert, and/or deactivate the cold weather operating mode.

PCU 50 may also communicate with a human-machine interface (HMI) 70 configured to prompt for activation of a cold weather operating mode when forecasted or predicted ambient temperatures are below an associated temperature threshold that may be associated with reduced discharge capability of battery 20. HMI 70 may be implemented by a touch sensitive display screen and/or lights, switches, buttons, and the like to display information to a vehicle operator and receive input associated with activating a cold weather mode according to various embodiments. Nomadic device 66 may also function as an HMI, either alone or in combination with an HMI 70 permanently installed in the vehicle.

Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic, software, algorithms, etc. executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

To crank or start the engine 14, the disconnect clutch 26 is at least partially engaged to transfer at least a portion of the torque from electric machine 18 through the disconnect clutch 26 to the engine 14. Electric machine 18 is powered by battery 20 through power electronics 56. Extremely cold ambient temperatures may impact the power discharge capability of battery 20. As such, PCU 50 may operate engine 14 and electric machine 18 in a cold weather mode to maintain the state of charge (SOC) of battery 20 at a higher minimum SOC during a current drive cycle so that sufficient power is available to power electric machine 18 to start the engine 14 during a subsequent drive cycle after soaking in forecasted cold ambient temperatures.

In any mode of operation, the electric machine 18 may act as a motor and provide a driving force for the powertrain 12. Alternatively, the electric machine 18 may act as a generator and convert kinetic energy from the powertrain 12 into electric energy to be stored in the battery 20. The electric machine 18 may act as a generator while the engine 14 is providing propulsion power for the vehicle 10, for example, to reach and/or maintain a desired battery SOC. The desired SOC may vary based on the current vehicle operating mode, as well as based on vehicle and ambient operating conditions. The electric machine 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely representative and is not intended to be limiting. Other configurations are contemplated that utilize selective engagement of both an engine and a motor to transmit through the transmission. For example, the electric machine 18 may be offset from the crankshaft 28, an additional motor may be provided to start the engine 14, and/or the electric machine 18 may be provided between the torque converter 22 and the gearbox 24. Other configurations are contemplated within the scope of the claimed subject matter. For example, while not specifically illustrated in the configuration of FIG. 1, vehicle 10 may comprise a plug-in hybrid electric vehicle with a battery charger configured to receive power from an external power source, such as a utility electric grid, such as illustrated in the embodiments of FIG. 2.

Figure 2:
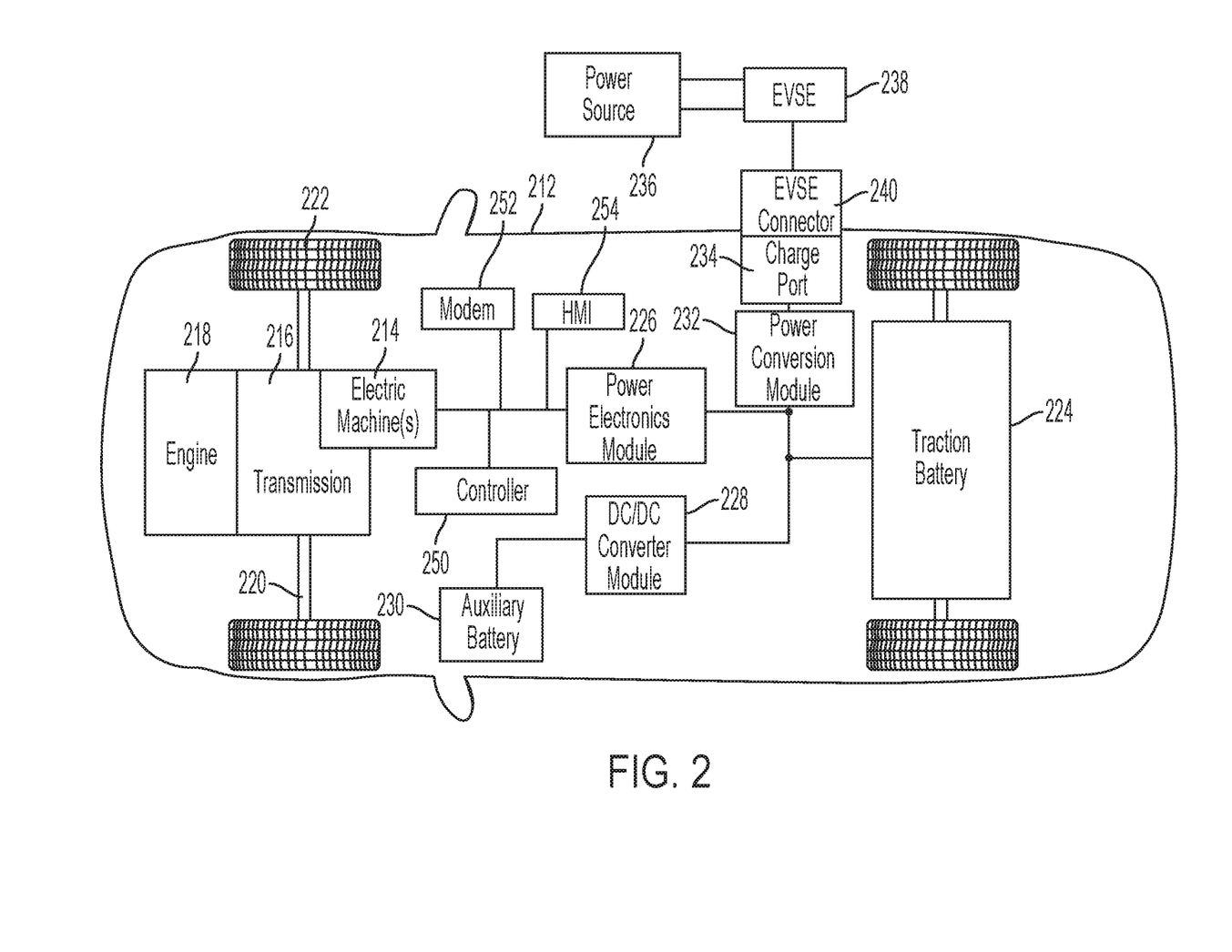
FIG. 2 is a block diagram of a representative plug-in electrified vehicle having an internal combustion engine, a traction battery, and an auxiliary battery including a cold battery power discharge strategy according to one or more embodiments.

FIG. 2 depicts a representative plug-in hybrid electric vehicle (HEV) having a cold weather operating mode according to embodiments of the disclosure. Plug-in hybrid electric vehicle 212 may comprise one or more electric machines 214 mechanically connected to a hybrid transmission 216, which may be a step-ratio transmission, power split transaxle, or continuously variable transmission, for example. The electric machines 214 may be capable of operating as a motor or a generator. In addition, the hybrid transmission 216 is mechanically connected to an engine 218. The hybrid transmission 216 is also mechanically connected to a drive shaft 220 that is mechanically connected to the wheels 222. The electric machines 214 can provide propulsion and deceleration capability when the engine 218 is turned on or off. The electric machines 214 also act as generators and can provide fuel economy benefits by recovering energy that would normally be lost as heat in the friction braking system. The electric machines 214 may also reduce vehicle emissions by allowing the engine 218 to operate at more efficient speeds and allowing the hybrid electric vehicle 212 to be operated in electric mode with the engine 218 off under certain conditions.

A traction battery or battery pack 224 stores energy that can be used by the electric machines 214 for vehicle propulsion or for cranking and starting engine 218. As illustrated in FIG. 2, vehicle 212 does not include a low-voltage starter motor for cranking and starting engine 218, although some embodiments may include a conventional starter motor and rely on the starter motor under at least some conditions to crank and start engine 218. A vehicle battery pack 224 typically provides a high voltage DC output. The traction battery 224 is electrically connected to one or more power electronics modules. One or more contactors (not shown) may isolate the traction battery 224 from other components when opened and connect the traction battery 224 to other components when closed. The power electronics module 226 is also electrically connected to the electric machines 214 and provides the ability to bi-directionally transfer energy between the traction battery 224 and the electric machines 214. For example, a typical traction battery 224 may provide a DC voltage while the electric machines 214 may require a three-phase AC current to function. The power electronics module 226 may convert the DC voltage to a three-phase AC current as required by the electric machines 214. In a regenerative mode, the power electronics module 226 may convert the three-phase AC current from the electric machines 214 acting as generators to the DC voltage required by the traction battery 224. The description herein is equally applicable to a pure electric vehicle. For a pure electric vehicle, the hybrid transmission 16 may be a gear box connected to an electric machine 214 and the engine 218 may not be present.

In addition to providing energy for propulsion, the traction battery 224 may provide energy for other vehicle electrical systems. A typical system may include a DC/DC converter module 228 that converts the high voltage DC output of the traction battery 224 to a low voltage DC supply that is compatible with other vehicle loads. Other high-voltage loads, such as compressors and electric heaters, may be connected directly to the high-voltage without the use of a DC/DC converter module 228. The low-voltage systems may be electrically connected to an auxiliary battery 230, such as a 12V, 24V, or 48V battery, for example. Some applications may not include an auxiliary battery 230.

The vehicle 212 may be an electric vehicle or a plug-in hybrid vehicle in which the traction battery 224 may be recharged by an external power source 236. The external power source 236 may be a connection to an electrical outlet. The external power source 236 may be electrically connected to electric vehicle supply equipment (EVSE) 238. The EVSE 238 may provide circuitry and controls to regulate and manage the transfer of energy between the power source 236 and the vehicle 212. The external power source 236 may provide DC or AC electric power to the EVSE 238. The EVSE 238 may have a charge connector 240 for plugging into a charge port 234 of the vehicle 212. The charge port 234 may be any type of port configured to transfer power from the EVSE 238 to the vehicle 212. The charge port 234 may be electrically connected to a charger or on-board power conversion module 232. The power conversion module 232 may condition the power supplied from the EVSE 238 to provide the proper voltage and current levels to the traction battery 224. The power conversion module 232 may interface with the EVSE 238 to coordinate the delivery of power to the vehicle 212. The EVSE connector 240 may have pins that mate with corresponding recesses of the charge port 234. Alternatively, various components described as being electrically connected may transfer power using a wireless inductive coupling.

The various components described may have one or more associated controllers 250 to control and monitor the operation of the components. The controllers 250 may communicate via a serial bus (e.g., Controller Area Network (CAN)) or via discrete conductors to implement a cold weather operating mode for robust cold weather battery discharge capability as described with respect to one or more embodiments. The vehicle 212 may include an HMI 254 and transceiver or modem 252, and may communicate with a nomadic device as described with reference to vehicle 10 of FIG. 1.

Figure 3:
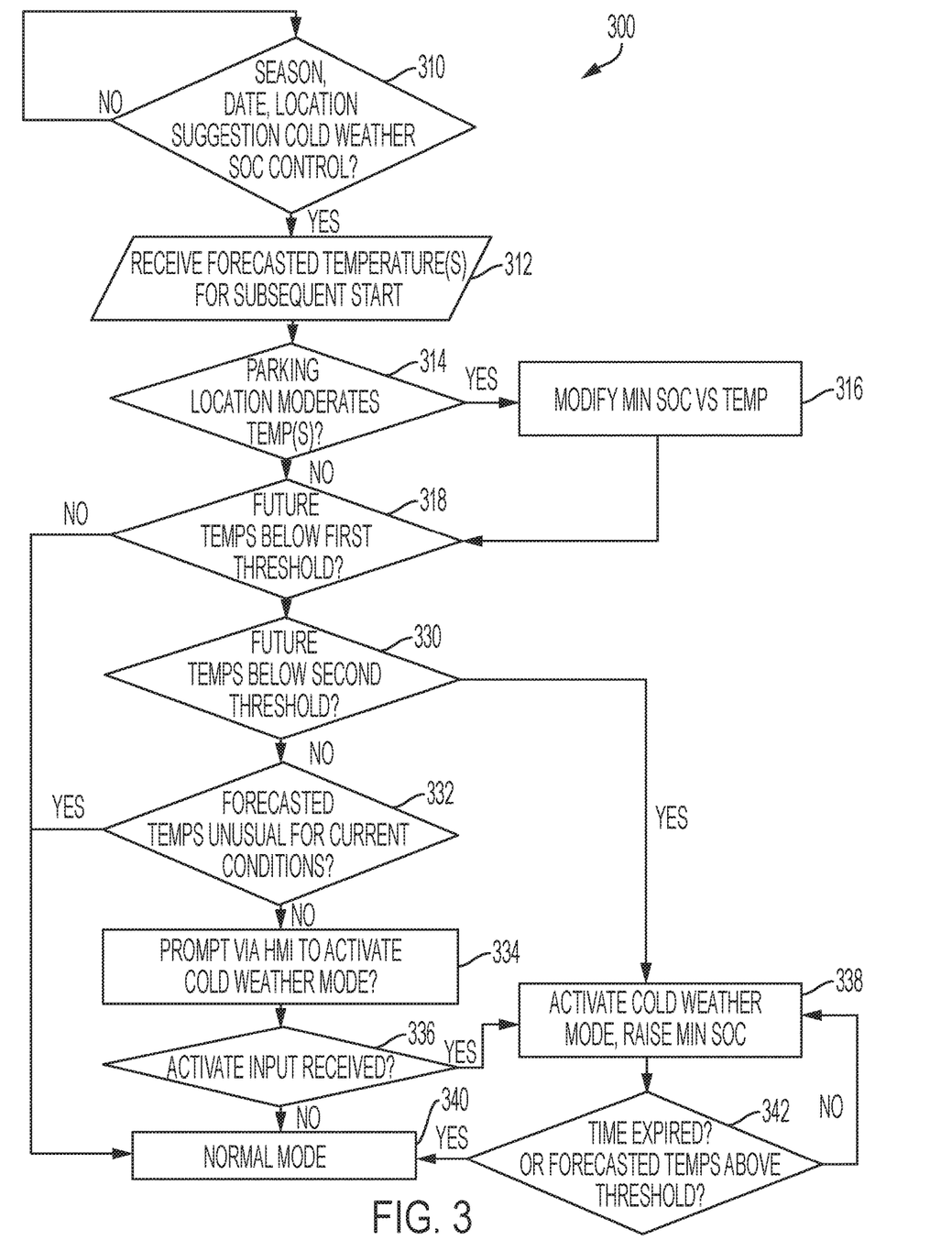
FIG. 3 is a flow chart illustrating operation of a system or method for providing robust cold battery power discharge in an electrified vehicle according to one or more embodiments.

FIG. 3 is a flowchart illustrating operation of a vehicle or method for providing robust cold weather battery discharge capability according to one or more embodiments of the disclosure. As previously described, the amount of power available from the battery (regardless of temperature) is directly proportional to the battery SOC. Even if the ambient temperature and temperature of the battery is −40° C., for example, a battery having 100% SOC will likely be able to provide sufficient power output capability to spin up the electric machine and close the disconnect clutch when the electric machine reaches an appropriate rotational speed to crank and start the engine. The cold weather operating mode according to various embodiments of the present disclosure preemptively prepares the HV battery for the anticipated engine start at very cold temperatures by adjusting (raising) the minimum SOC during the current drive cycle to a calibrated or desired level known to be capable of providing the needed power for the forecasted or predicted temperature for the anticipated subsequent engine start.

In various embodiments, the strategy does not require prediction or estimation of the future temperature from on-board sensors. Rather, the vehicle may receive weather data from one of various weather services or sources via a vehicle transceiver and/or coupled nomadic device. As many current vehicle models are equipped with a modem or transceiver and HMI, a cold weather operating mode may be added to such vehicles as a software update without the requirement of additional hardware or other devices.

Strategy 300 may include receiving information or data to validate weather or temperature data as generally represented at 310. The data may include a vehicle location, current season, date, time of day, altitude/elevation, etc. If the current data is indicative of possible cold weather that may impact battery discharge capability at 310, the vehicle may receive weather data from a satellite or cellular link as represented at 312. Alternatively, the vehicle may receive weather data include forecasted, anticipated, or expected temperature(s) for a period during which a future engine start is anticipated. A future engine start may be default to a following day, or a predetermined period of time, such as 12-24 hours for example. Alternatively, trip or destination data entered in a vehicle navigation system or coupled nomadic device may be used to determine the date of a future anticipated engine start. Destination information may also be used to determine whether the vehicle will be parked at a location where ambient temperature is moderated 314, such as an interior or exterior parking structure, residential garage, commercial garage below grade, etc. If the anticipated parking location (as determined from previous trips, as entered by driver, or from destination information, for example) indicates that the vehicle temperature may vary from exposed ambient temperatures 314, the cold weather SOC minimum(s) may be modified as represented at 316. For example, an adjustment factor or temperature offset may be applied based on the parking location.

If the forecasted temperature is not below a first threshold at 318, the controller operates the vehicle in normal mode with associated SOC minimum thresholds as represented at 340. Otherwise, the controller may determine whether the temperature is also below a second threshold at 330, and if so, may optionally automatically activate the cold temperature mode and increase the minimum battery SOC as represented at 338. The forecasted or future temperature used to control the cold weather operating mode may be an average temperature or a minimum temperature during the future period for which an engine start is expected or anticipated. As previously described, the future period may default to a number of hours or days after the current drive cycle when the vehicle is powered down. Alternatively, the future period may be determined using previous driving habits, planned trips parsed from calendar or navigation data, or specified by the driver when prompted to activate the cold weather operating mode.

If the future temperature(s) is below the first threshold at 318 but not below the second threshold at 330, block 332 may determine whether the forecasted temperature(s) is unusual for current conditions to provide a validity check for the received temperature data. For example, if the vehicle is currently in a tropical location but received temperatures indicate extremely cold weather, the controller may generate a caution or warning based on the discrepancy, or may simply return to normal mode at 340. If the forecasted temperature is plausible for current vehicle location, season, time of day, altitude, ambient temperature, etc. then the driver may be prompted via a HMI or coupled nomadic device to activate the cold weather mode at 334. Additional data may be input or verified at 334 associated with operation in the cold weather mode, such as the intended destination, the period anticipated for a subsequent engine start, anticipated parking location or destination, etc.

Upon receipt of cold weather mode activation at 336, the cold weather operating mode is activated and the minimum battery SOC is adjusted at 338 based on the forecasted temperature for the future period during which an engine start is anticipated or expected. The vehicle may then be controlled to maintain the battery SOC above the associated minimum SOC during the current drive cycle to provide sufficient battery discharge capability to start the engine using the electric machine during the next drive cycle. The minimum SOC threshold may increase as the forecasted temperature decreases. Alternatively, a single cold weather SOC minimum may be applied when the forecasted temperature is below the first threshold. The minimum SOC threshold may also be adjusted based on the length of the time period after the current drive cycle, i.e. the minimum may also increase based on the length of time that the vehicle will be subject to cold temperatures.

As also shown in FIG. 3, the cold weather operating mode may be deactivated at 342 after a predetermined time has expired or if the forecasted temperature(s) are above the first temperature threshold for some predetermined time period. The controller then returns to the normal operating mode at 340.

As such, robust cold weather starting may be provided by maintaining a higher minimum SOC while operating in a cold weather mode based on a forecasted or anticipated cold ambient temperature for a subsequent engine start. Prompting the driver to activate the cold weather mode when forecasted temperature(s) are below an associated threshold provides robust battery power discharge for engine starting without impacting efficiency or performance when ambient temperatures do not significantly impact battery discharge capability or engine cranking and starting. More robust engine cold starting capability using the high-voltage traction battery and traction motor according to one or more embodiments of the present disclosure facilitates elimination of a traditional engine starter motor and low-voltage auxiliary battery to reduce vehicle weight, cost, and part count.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an engine;
a battery;
a step-ratio transmission;
an electric machine configured to be selectively powered by the battery and to selectively charge the battery and coupled by a first clutch to the engine and coupled by a second clutch to the step-ratio transmission; and
a controller configured to:
receive trip data including a future destination;
determine a future time period at the future destination during which a next engine start is expected after the engine is shutdown from a current drive cycle; and
operate the engine to maintain a state of charge (SOC) of the battery above an associated SOC threshold during the current drive cycle, wherein the associated SOC threshold is adjusted to an SOC that provides sufficient power to spin the electric machine and close the first clutch to start the engine at the determined future time the SOC based on a forecasted temperature at the future destination for the determined future time period during which the engine start is expected.

2. The vehicle of claim 1 further comprising a human-machine interface (HMI) in communication with the controller and configured to prompt for input to select a cold weather mode, wherein the associated SOC threshold is adjusted in response to the cold weather mode being selected.

3. The vehicle of claim 2 wherein the cold weather mode is automatically selected in response to the forecasted temperature at the future destination during the determined future time being less than an associated temperature threshold.

4. The vehicle of claim 3 wherein the controller is configured to automatically deselect the cold weather mode in response to the forecasted temperature being above the associated temperature threshold for a selected period of time.

5. The vehicle of claim 1 wherein the controller starts the engine by engaging the first clutch to couple the electric machine to the engine after the electric machine has reached a predetermined rotational speed.

6. The vehicle of claim 1 wherein the battery comprises a high-voltage traction battery and wherein the vehicle does not include an engine starter motor configured to engage an engine flywheel.

7. The vehicle of claim 1 wherein the controller is configured to receive the forecasted temperature wirelessly.

8. The vehicle of claim 7 further comprising a transceiver configured to receive the forecasted temperature and communicate the forecasted temperature to the controller.

9. The vehicle of claim 8 wherein the transceiver is configured to receive the forecasted temperature via a nomadic device paired or coupled to the transceiver.

10. The vehicle of claim 1 wherein the vehicle comprises a plug-in hybrid electric vehicle, wherein the battery comprises a high-voltage traction battery, and wherein the vehicle further comprises a charger configured to charge the battery from an external electrical grid.

11. The vehicle of claim 1 wherein the associated SOC threshold increases as the forecasted temperature decreases.

12. The vehicle of claim 1 wherein the forecasted temperature is based on the future destination indicated by the trip data.

13. A vehicle comprising:
an engine;
a battery;
an electric machine configured to propel the vehicle and selectively coupled to the engine to start the engine; and
a controller configured to:
determine a vehicle destination based on received trip data;
determine a time period during which a subsequent engine start is anticipated at the vehicle destination;
prompt for input to activate a cold weather mode in response to an expected ambient temperature at the vehicle destination being below a first temperature threshold during the determined time period; and
operate the engine and electric machine to maintain a state of charge (SOC) of the battery above a first SOC threshold corresponding to power required to close a first clutch coupling the electric machine to the engine and start the engine in response to activation of the cold weather mode, and a second SOC threshold lower than the first SOC threshold otherwise.

14. The vehicle of claim 13 wherein the controller is further configured to automatically activate the cold weather mode in response to the expected ambient temperature at the vehicle destination being below a second temperature threshold during the time period.

15. The vehicle of claim 13 further comprising a step-ratio transmission, wherein the electric machine comprises a shaft coupled to the engine by the first clutch and to the step-ratio transmission by a second clutch.

16. The vehicle of claim 13 further comprising a transceiver configured to wirelessly receive the expected ambient temperature from a weather service.

17. The vehicle of claim 16 wherein the transceiver is configured to wirelessly receive the expected ambient temperature from a paired nomadic device.

18. A method for controlling a vehicle having an engine, a battery, and an electric machine configured to propel the vehicle and selectively coupled to the engine to start the engine, the method comprising, by a vehicle controller:
receiving trip data including a future vehicle destination at a future time period;
predicting a future engine start at the future vehicle destination during the future time period for the future engine start;
operating the vehicle in a cold weather mode in response to an input from a vehicle HMI, or in response to ambient temperature at the future vehicle destination being below an associated second temperature threshold;
operating the engine during travel to the future vehicle destination to maintain a battery state of charge (SOC) above a first SOC threshold in response to an expected ambient temperature at the future vehicle destination during the future time period of the future engine start being below a first temperature threshold when operating in the cold weather mode; and
operating the engine to maintain the SOC above a second SOC threshold when not operating in the cold weather mode, wherein the second SOC threshold is lower than the first SOC threshold.

19. The method of claim 18 further comprising prompting for activation of the cold weather mode in response to the expected ambient temperature at the future vehicle destination being below the first temperature threshold.

20. The method of claim 19 further comprising automatically activating the cold weather mode in response to the expected ambient temperature at the future vehicle destination being below the second temperature threshold.

* * * * *